(12) United States Patent
Liu et al.

(10) Patent No.: US 11,742,904 B2
(45) Date of Patent: Aug. 29, 2023

(54) METHOD AND APPARATUS FOR MULTI-USER MULTI-ANTENNA TRANSMISSION

(71) Applicant: Telefonaktiebolaget LM Ericsson (publ), Stockholm (SE)

(72) Inventors: Chunhui Liu, Beijing (CN); Zhenguo Ma, Beijing (CN); Huaisong Zhu, Beijing (CN); Yipeng Zhang, Beijing (CN); Yiliang Chen, Beijing (CN); Chen Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/769,773

(22) PCT Filed: Oct. 23, 2019

(86) PCT No.: PCT/CN2019/112813
§ 371 (c)(1),
(2) Date: Apr. 18, 2022

(87) PCT Pub. No.: WO2021/077336
PCT Pub. Date: Apr. 29, 2021

(65) Prior Publication Data
US 2022/0385341 A1 Dec. 1, 2022

(51) Int. Cl.
H04L 23/02 (2006.01)
H04B 7/0452 (2017.01)
(Continued)

(52) U.S. Cl.
CPC ........... *H04B 7/0452* (2013.01); *H04B 7/022* (2013.01); *H04B 7/0417* (2013.01); *H04B 7/0456* (2013.01)

(58) Field of Classification Search
CPC .. H04B 7/0417; H04B 7/0452; H04B 7/0695; H04B 7/0413; H04L 5/0053; H04L 67/12; H04L 5/0094; H04W 24/10; H04W 72/12
(Continued)

(56) References Cited

U.S. PATENT DOCUMENTS

2010/0303034 A1 12/2010 Chen et al.
2012/0093089 A1 4/2012 Park et al.
(Continued)

FOREIGN PATENT DOCUMENTS

| CN | 108282198 A | 7/2018 |
| CN | 109792285 A | 5/2019 |
| CN | 110326243 A | 10/2019 |

OTHER PUBLICATIONS

3GPP, "3GPP TS 38.211 V15.6.0", 3rd Generation Partnership Project; Technical Specification Group Radio Access Network; NR; Physical channels and modulation (Release 15), Jun. 2019, 1-97.
(Continued)

*Primary Examiner* — Khai Tran
(74) *Attorney, Agent, or Firm* — Murphy, Bilak & Homiller, PLLC

(57) ABSTRACT

Various embodiments of the present disclosure provide a method for multi-user multi-antenna transmission. The method which may be performed by a network node comprises calculating parameters for multi-user multi-antenna transmission, according to measurement information reported by a first set of terminal devices. The method further comprises selecting, from the first set of terminal devices, a second set of terminal devices to which the multi-user multi-antenna transmission is to be applied, based at least in part on performance gain estimated according to the parameters for multi-user multi-antenna transmission.

20 Claims, 11 Drawing Sheets

(51) Int. Cl.
   *H04B 7/022* (2017.01)
   *H04B 7/0417* (2017.01)
   *H04B 7/0456* (2017.01)
(58) Field of Classification Search
   USPC .................................... 375/262, 260, 267
   See application file for complete search history.

(56) References Cited

U.S. PATENT DOCUMENTS

| | | | |
|---|---|---|---|
| 2012/0270535 A1* | 10/2012 | Chen .................... | H04B 7/0486 455/422.1 |
| 2012/0300656 A1 | 11/2012 | Cui et al. | |
| 2015/0200718 A1 | 7/2015 | Sajadieh et al. | |
| 2016/0323025 A1* | 11/2016 | Liu ...................... | H04B 7/0478 |
| 2023/0041235 A1* | 2/2023 | Liu ........................ | H04L 5/005 |

OTHER PUBLICATIONS

3GPP, "3GPP TS 38.212 V15.6.0", 3rd Generation Partnership Project; Technical Specification Group Radio Access Network; NR; Multiplexing and channel coding (Release 15), Jun. 2019, 1-101.
3GPP "3rd Generation Partnership Project; Technical Specification Group Radio Access Network; NR; Physical layer procedures for data (Release 15)", 3GPP TS 38.214 V15.6.0, Jun. 2019, 1-105.
Author Unknown, "Precoding", Precoding—Wikipedia, <https://en.wikipedia.org/wiki/Precoding#cite_note-1 第>, accessed Aug. 15, 2019, Dec. 26, 2018, 1-9.

* cited by examiner

METHOD AND APPARATUS FOR MULTI-USER MULTI-ANTENNA TRANSMISSION

FIELD OF THE INVENTION

The present disclosure generally relates to communication networks, and more specifically, to method and apparatus for multi-user multi-antenna transmission.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate with lower latency. In order to meet dramatically increasing network requirements, one interesting option for communication technique development is to employ multiple antenna technology such as multiple input multiple output (MIMO) technology. Multiple antenna systems allow transmitting signals focused towards certain spatial regions. This creates beams (also referred to as beamforming) whose coverage can go beyond transmissions using non-beamformed signals. From the perspective of networks, it may be advantageous to achieve potentially performance gain by implementing proper beamforming in consideration of multi-user (MU) transmission.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a wireless communication network such as 5G/NR network, a radio device such as a user equipment (UE) and a next generation NodeB (gNB) may be equipped with multiple antenna elements. In the context of MU MIMO communication, the gNB may design downlink (DL) transmissions according to a reciprocity-based solution. For the reciprocity-based DL MU MIMO transmission, large resources may be required for channel estimation of many UEs. On the other hand, a codebook-based solution may be employed by the gNB to allocate time-frequency resources to UEs for DL transmissions according to channel state information (CSI) reports from the UEs. However, since measurement information in a CSI report is usually based on single-user (SU) beamforming, the gNB may only realize local optimum for SU MIMO transmission of each UE. For MU MIMO transmission, it may be desirable to achieve global optimum.

Various embodiments of the present disclosure propose a solution for MU MIMO transmission, which can enable SU-based CSI reports from multiple terminal devices to be utilized by a network node to determine MU MIMO transmission parameters (e.g., precoding matrices), so that the codebook-based MU MIMO transmission can be realized with global optimum for MU grouping.

According to a first aspect of the present disclosure, there is provided a method which may be performed by a network node such as a base station. The method comprises calculating parameters for multi-user multi-antenna transmission, according to measurement information reported by a first set of terminal devices. The method further comprises selecting, from the first set of terminal devices, a second set of terminal devices to which the multi-user multi-antenna transmission is to be applied, based at least in part on performance gain estimated according to the parameters for multi-user multi-antenna transmission.

In accordance with some exemplary embodiments, the measurement information reported by the first set of terminal devices may comprise single-user based transmission parameters preferred by the first set of terminal devices.

In accordance with some exemplary embodiments, the parameters for multi-user multi-antenna transmission may comprise multi-user based precoding matrices.

In accordance with some exemplary embodiments, the multi-user based precoding matrices may be at least partly different from single-user based precoding matrices indicated by the measurement information.

In accordance with some exemplary embodiments, the multi-user based precoding matrices and channel matrices of the second set of terminal devices may have a correlation satisfying a certain criterion.

In accordance with some exemplary embodiments, the performance gain estimated according to the parameters for multi-user multi-antenna transmission may comprise at least one of: power gain, signal to interference plus noise ratio (SINR) gain, and throughput gain.

In accordance with some exemplary embodiments, the selection of the second set of terminal devices from the first set of terminal devices may be triggered by a specific event.

In accordance with some exemplary embodiments, the method according to the first aspect of the present disclosure may further comprise: applying the multi-user multi-antenna transmission to the second set of terminal devices, by performing at least one of phase adjustment and amplitude adjustment of precoders for the second set of terminal devices according to the parameters for multi-user multi-antenna transmission.

In accordance with some exemplary embodiments, the multi-user multi-antenna transmission may support at least one of: single-layer transmission per device, and multi-layer transmission per device.

In accordance with some exemplary embodiments, the second set of terminal devices may be assigned same frequency-time resource by the network node.

According to a second aspect of the present disclosure, there is provided an apparatus which may be implemented as a network node. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a network node. The apparatus comprises a calculating unit and a selecting unit. In accordance with some exemplary embodiments, the calculating unit may be operable to carry out at least the calculating step of the method according to the first aspect of the present disclosure. The selecting unit may be operable to carry out at least the selecting step of the method according to the first aspect of the present disclosure.

According to a fifth aspect of the present disclosure, there is provided a method which may be performed by a terminal device such as a UE. The method comprises receiving, from a network node, multi-user multi-antenna transmission for a second set of terminal devices comprising the terminal device. In accordance with some exemplary embodiments, parameters for the multi-user multi-antenna transmission can be calculated according to measurement information reported to the network node by a first set of terminal devices. The second set of terminal devices may be selected from the first set of terminal devices based at least in part on performance gain estimated according to the parameters for multi-user multi-antenna transmission.

In accordance with some exemplary embodiments, the method according to the fifth aspect of the present disclosure may further comprise: processing the received multi-user multi-antenna transmission, for example, to get information for the terminal device.

In accordance with some exemplary embodiments, the terminal device may be assigned same frequency-time resource with other terminal devices in the second set of terminal devices.

In accordance with some exemplary embodiments, the multi-user multi-antenna transmission may be received by the terminal device from the network node which is configured to perform the method according to the first aspect of the present disclosure.

According to a sixth aspect of the present disclosure, there is provided an apparatus which may be implemented as a terminal device. The apparatus comprises one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a terminal device. The apparatus comprises a receiving unit and optionally a processing unit. In accordance with some exemplary embodiments, the receiving unit may be operable to carry out at least the receiving step of the method according to the fifth aspect of the present disclosure. The processing unit may be operable to carry out at least the processing step of the method according to the fifth aspect of the present disclosure.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the first aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the first aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the fifth aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the fifth aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the fifth aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the fifth aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the first aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the first aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
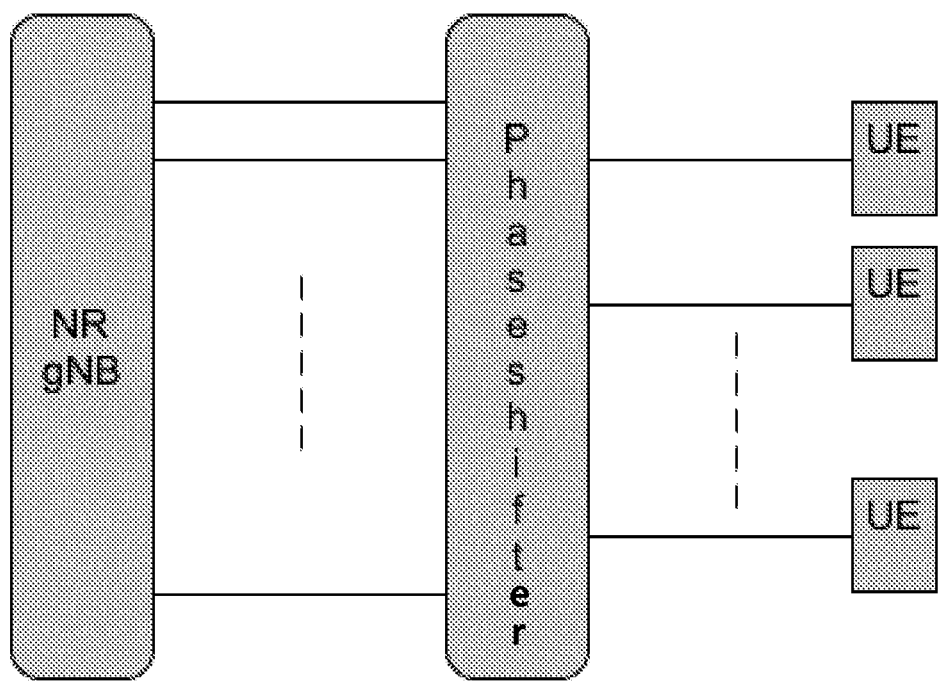
FIG. 1 is a diagram illustrating an exemplary communication scenario according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-tomachine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Next-generation communication networks such as NR/5G can be improved by wireless network technologies deploying in near future. The primary technologies may include, for example, millimeter wave bands (e.g., 26 GHz, 28 GHz, 38 GHz, and 60 GHz) offering performance as high as 20 gigabits per second, massive MIMO (e.g., 64-256 antennas) offering performance up to ten times current 4G networks, "Low-band 5G" and "Mid-band 5G" using frequencies from 600 MHz to 6 GHz. It is being designed to significantly improve the performance, flexibility, scalability and efficiency of current mobile networks, and to get the most out of the available spectrum that can be licensed, shared or unlicensed, across a wide variety of spectrum bands.

Precoding is a generalization of beamforming to support multi-stream (or multi-layer) transmission in multi-antenna wireless communications. In conventional single-stream beamforming, the same signal is emitted from each of the transmit antennas with appropriate weighting (phase and gain) such that the signal power is maximized at the receiver output. When the receiver has multiple antennas, single-stream beamforming cannot simultaneously maximize the signal level at all of the receive antennas. In order to maximize the throughput in multiple receive antenna systems, multi-stream transmission is generally required. In the case of MU MIMO communication, the data streams are intended for different users (known as spatial division multiple access (SDMA)) and some measurement of the total throughput (e.g., the sum performance or max-min fairness) is maximized. In NR/5G communication networks, DL transmissions can be mapped to different layers.

FIG. 1 is a diagram illustrating an exemplary communication scenario according to an embodiment of the present disclosure. For simplicity, FIG. 1 only depicts exemplary network elements such as a gNB, several UEs and a phase shifter. As shown in FIG. 1, the UEs which may be located in different directions and/or have different channel conditions can be attached to a NR cell which is provisioned by the gNB in a specific area such as a rural area. According to an exemplary embodiment, the gNB can perform phase shift to adapt to the channels of the UEs. It will be appreciated that there may be other network scenarios where more than one network node such as gNB can be deployed in the network to implement different system structures and provide services to more than one terminal device such as UE. In practice, a wireless communication system may further include any additional elements suitable to support communication between wireless devices or between a wireless device and another communication device, such as a landline telephone, a service provider, or any other network node or terminal device. The wireless communication system may provide communication and various types of services to one or more wireless devices to facilitate the wireless devices' access to and/or use of the services provided by, or via, the wireless communication system.

For a NR system supporting multi-antenna communication, the reciprocity-based DL MU-MIMO solution may require large design effort. On the other hand, the reciprocity-based DL MU MIMO solution may need large sounding reference signal (SRS) resource and memory resource to store the channel estimates for many UEs. As an alternative solution, the codebook-based DL MU MIMO transmission may be used for a NR system.

In a wireless communication network, channel status information (CSI) scheme is a mechanism that a UE can measure various radio channel quality and report the result to a network node such as a gNB. According to an exemplary embodiment, when the network node allocates the channel status information-reference signal (CSI-RS), it can select a specific row from Table 7.4.1.5.3-1 as described in 3GPP TS38.211 and fill in a set of resource elements with the specific signal. The network node can inform the UE of all the details of CSI-RS via a radio resource control (RRC) message. In terms of implementation and complexity, it may be easier to let a single CSI report represent the channel quality of the full band. In reality, such report may not accurately represent the channel quality for every point across the spectrum. In terms of accuracy, it may be better to let a single CSI report represent only each and every small portions of the spectrum. However, it may be more complicated to implement and the UE may need to send multiple CSI reports to notify the whole area of the spectrum. The case where the UE reports CSI that represents the full bandwidth is called "Wideband channel quality information (CQI)" and the case where the UE reports CSI that represents a small portion of bandwidth is called "Subband CQI". The UE can use physical uplink shared channel (PUSCH) to report CSI in aperiodic manner and use physical uplink control channel (PUCCH) or PUSCH for the periodic report.

According to a CSI report, the gNB can assign the same frequency and time resource to a few of UEs with different precoding matrix indicators (PMIs) to realize MU MIMO communication. For example, the UEs can be grouped with the beam separation considered. However, this is not sufficient and optimum. The CSI-RS measurement and report are based on single-user (SU) beamforming. This may achieve local optimum for SU MIMO communication of each UE. However, for MU MIMO communication, the gNB may expect global optimum of cell throughput. The global optimum is not equivalent to the sum of local optimums.

Considering restrictions from the local optimum, some legacy implementations set a restriction of beam separation. As an example, if the beam separation is large enough, even local optimum may tend to be converged to global optimum. However, this beam-separation based solution is not an efficient solution in the real world, due to the design of 3GPP CSI report mechanism. No matter LTE or NR, the current CSI codebook is generated with unified amplitude for each precoder, or only adjusting phases instead of amplitudes of precoders when UEs are located in different directions.

Since there is no amplitude adjustment, a beam generated from the CSI codebook may have the maximum transmission power but relatively higher sidelobe. This sidelobe may greatly reduce the MU grouping possibility. As an example, for the 8-port CSI codebook defined by 3GPP, if an SU MIMO PMI is used to realize MU MIMO communication (suppose 20 dB signal to interference plus noise ratio (SINR) is required), inter-UE direction of arrival (DoA) separation needs to be larger than 42 degrees. But for typical 3-sector configuration, each cell only covers 120 degrees, which means only two UEs can do MU-MIMO communication with the SU-MIMO PMI in the worst case.

In order to solve at least one of the existing issues, various exemplary embodiments of the present disclosure propose a solution for increasing tolerance of codebook-based MU MIMO communication. According to the proposed solution, SU-based CSI reports from UEs can be used as inputs to the MU grouping by a gNB to achieve global optimum of MU MIMO communication. In some exemplary embodiments, the MU MIMO based optimal precoding matrices can be used for MU MIMO transmission. According to some exemplary embodiments, beam separation and other channel parameters (e.g., SINR, cell throughput, etc.) may be considered to evaluate the MU chances. Thus, the gNB can perform MU grouping with global optimum, and the MU MIMO transmission may be more tolerable against beam correlations.

Figure 2:
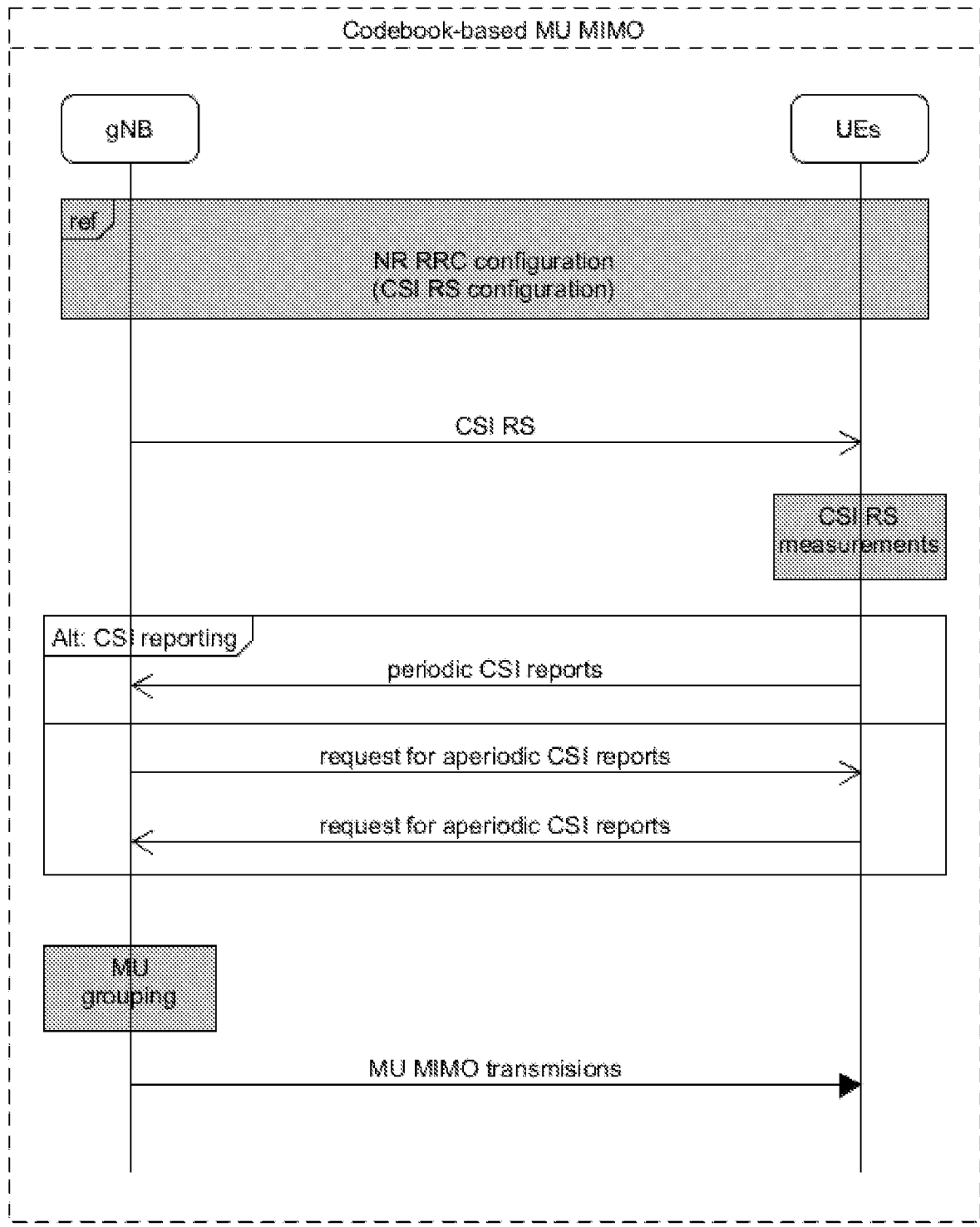
FIG. 2 is a diagram illustrating an example of codebook-based MU MIMO communication according to an embodiment of the present disclosure.

FIG. 2 is a diagram illustrating an example of codebook-based MU MIMO communication according to an embodiment of the present disclosure. The codebook-based MU MIMO communication may be realized between a gNB and UEs in a 5G/NR network. It will be appreciated that signaling messages and transmission configurations shown in FIG. 2 are just examples, and more or less alternative signaling messages and transmission configurations may be involved in the MU MIMO implementations according to embodiments of the present disclosure.

As shown in FIG. 2, a UE may be attached to a cell provisioned by the gNB. Some RRC configuration such as CSI-RS configuration may be sent to the UE by the gNB to configure CSI-RS. According to the CSI-RS configuration, the UE can perform CSI-RS measurements and report channel quality, e.g., including CQI, PMI and rank indication (RI). In accordance with an exemplary embodiment, the UE may transmit periodic CSI reports to the gNB. Alternatively or additionally, the UE may transmit aperiodic CSI reports to the gNB, in response to a request for the aperiodic CSI reports by the gNB. According to the CSI measurements reported by multiple UEs, the gNB can determine whether and how to perform MU MIMO transmissions. With the output MU MIMO grouping, the gNB may assign the same frequency and time resource to the grouped UEs, and perform MU MIMO transmissions to the UEs.

In accordance with an exemplary embodiment, the spatially oversampling precoding matrices may be employed in PMI design. Let $W_{k,i,n}$ denote the precoding matrix i for UE k over subband n. The CSI-RSs with different precoding matrices can be measured by UE k. The indices of the precoding matrices measured by UE k over subband n are included in set $\phi_{k,n}$. Let $Q_{k,i,n}$ denote the SINR with respect to the CQI feedback from UE k over subband n and PMI i. Then, the best beam or the preferred precoding matrix for UE k over subband n can be determined by:

$$W_{k,n} \leftarrow \max_{i \in \phi_{k,n}} Q_{k,i,n} \quad (1)$$

It can be seen that $W_{k,n}$ is associated to the highest SINR $Q_{k,n}$ among all SINR measurements for different PMIs. Let $H_{k,n}$ denote the expected channel matrix between the gNB and UE k over subband n. As sending CSI RS, $W_{i,n}$ is used as the precoding matrix of SU beamforming for UEs over subband n. In order to achieve the highest SINR or best performance (e.g., the best signal quality), the best channel fitting for the precoding matrix preferred by UE k over subband n can be expected as:

$$H_{k,n} = W_{k,n}^H \quad (2)$$

where the operator H denotes matrix Hermitian. The expected channel matrix can maximize the channel gain.

In accordance with an exemplary embodiment, for K UEs over subband n, the multiuser channel matrix can be constructed by putting all vectors of expected channel into one as below.

$$H_n = [H_{1,n}, H_{2,n}, \ldots, H_{K,n}] \quad (3)$$

In accordance with an exemplary embodiment, various MU beamforming schemes (e.g., zero-forcing (ZF), minimum mean square error (MMSE), etc.) may be applied to calculate the new precoding matrices. For example, if ZF is applied, then the new precoding matrix for MU beamforming over subband n can be calculated as:

$$G_n = H_n^H (H_n H_n^H)^{-1} \quad (4)$$

For UE k over subband n, the gain difference $\Delta_{k,n}$ between the effective channels with the legacy and the new precoding matrices can be approximated as below.

$$\Delta_{k,n} = \|\mathrm{norm}(G_{k,n})H_n\| / \|\mathrm{norm}(W_{k,n})H_n\| \quad (5)$$

where norm means that the total power of $G_{k,n}$ and $W_{k,n}$ is normalized for fair comparison.

In accordance with an exemplary embodiment, it can be evaluated whether UE k can be grouped into the MU MIMO transmission to achieve the maximum cell throughput as:

$$R_n = \sum_{k=1}^{K} \log_2\left(1 + \frac{Q_{k,n}}{K\Delta_{k,n}}\right) \quad (6)$$

where the channel and precoding matrices are normalized. Here, it is assumed that the transmission power for sending CSI-RS is the same as the transmission power for traffic channels. Otherwise, a power difference may need to be added into formula (6). In accordance with an exemplary embodiment, the best MU group can be selected by evaluating the cell throughputs at different MU grouping combinations.

It can be appreciated that although the above determination of whether and how to perform MU MIMO transmission is mainly described with respect to one layer per UE in MU MIMO transmission, the proposed solution for MU grouping may be extended to multiple layers per UE in MU MIMO transmission in a feasible way. Moreover, it can be realized that in addition to the approaches as described in connection with formulas (1)-(6), the construction of precoding matrices and the criterion of MU grouping can be based on other suitable schemes or rules.

Figure 3:
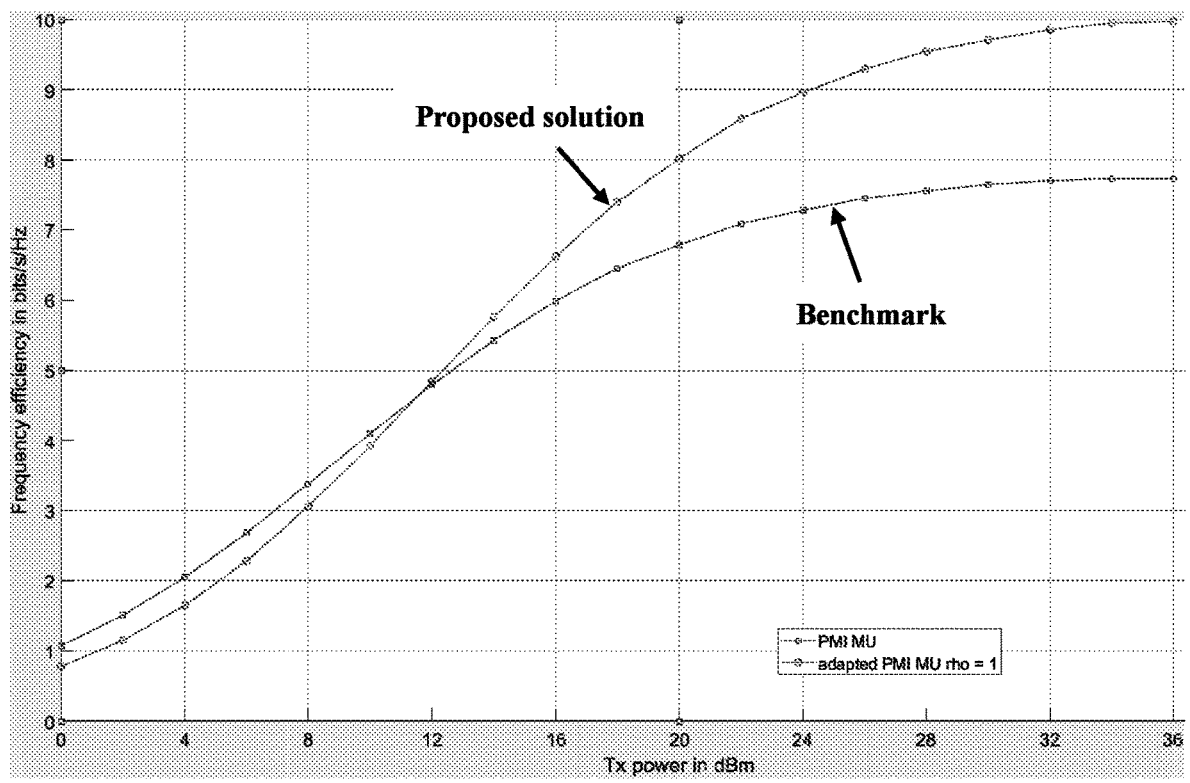
FIG. 3 is a diagram illustrating an exemplary simulation result of MU MIMO transmission according to an embodiment of the present disclosure.

FIG. 3 is a diagram illustrating an exemplary simulation result of MU MIMO transmission according to an embodiment of the present disclosure. The simulation is set up in an exemplary scenario where 32 transmit antennas are deployed at a gNB, 1 receive antenna is deployed at a UE, and each channel coefficient in the 32×1 channel between the gNB and the UE is generally given by normal distribution. The power of the channel matrix is normalized to 1, the noise power is set to 0 dBi to let the transmit power be equal to SINR, and one PRB is focused in the simulation. In the exemplary simulation, there are 8 UEs and thus 8×32×1 matrices are generated for each realization. According to 3GPP TS38.214, exemplary parameters such as N1=8, N2=2, O1=4 and O2=4 are chosen for 32 CSI-RS ports. There are 256 precoding matrices to perform spatial oversampling. The PMI which has the highest correlation with the realized channel is employed for each UE. A popular codebook-based MU method is selected as a benchmark. The UEs are grouped for MU MIMO transmission by employing the best PMI, i.e., the highest channel correlation.

FIG. 3 shows the frequency efficiency of the proposed solution according to exemplary embodiments of the present disclosure and the frequency efficiency of the benchmark solution, in the case of different transmit power. According to the proposed solution, ZF is used for MU MIMO design with adapted PMI, as described with respect to formulas (1)-(6). It can be seen from FIG. 3 that the proposed solution has significant gain over the benchmark at high SINR, and becomes slightly worse than the benchmark at low SINR. Thus, a threshold of SINR or other merits of signal quality may be set to determine whether to apply the proposed solution for MU MIMO transmission. According to an exemplary embodiment, it can be determined to apply the proposed solution in the case that SINR is above a predefined threshold.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 4:
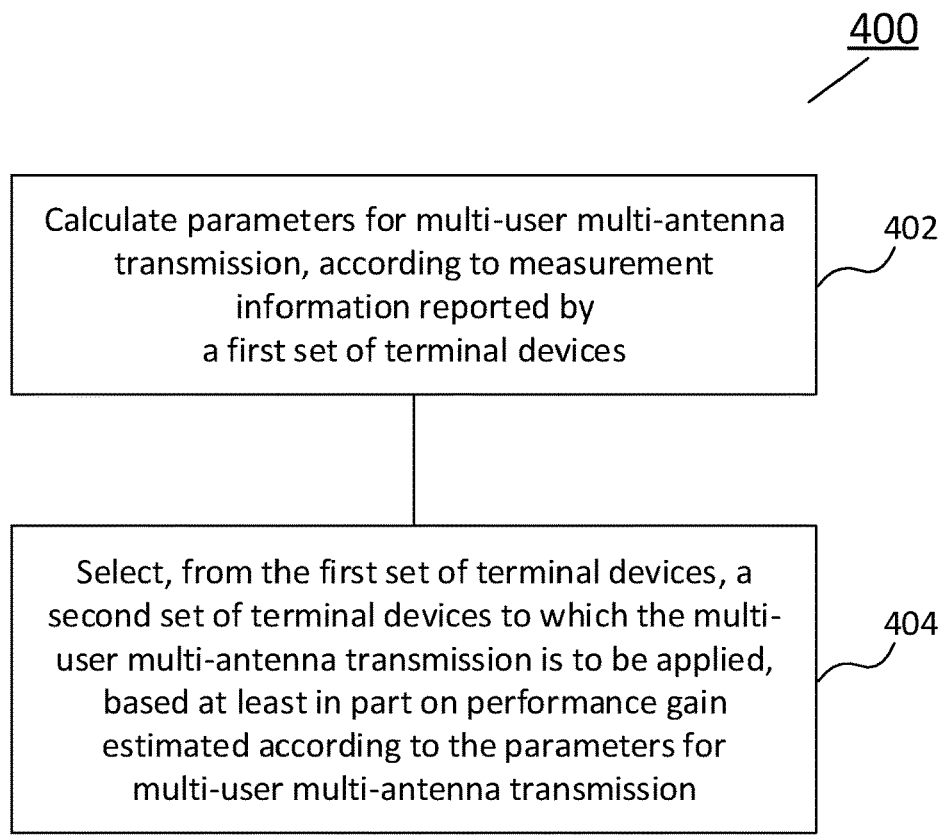
FIG. 4 is a flowchart illustrating a method according to some embodiments of the present disclosure.

FIG. 4 is a flowchart illustrating a method 400 according to some embodiments of the present disclosure. The method 400 illustrated in FIG. 4 may be performed by a network node or an apparatus communicatively coupled to the network node. In accordance with an exemplary embodiment, the network node may comprise a base station such as a gNB. The network node can be configured to communicate with one or more terminal devices such as UEs which may be able to support multiple antenna technology.

According to the exemplary method 400 illustrated in FIG. 4, the network node can calculate parameters for multi-user multi-antenna transmission (e.g., MU MIMO transmission), according to measurement information reported by a first set of terminal devices, as shown in block 402. In accordance with some exemplary embodiments, the measurement information reported by the first set of terminal devices may comprise single-user based transmission parameters (e.g., indicators or indices of single-user based precoding matrices, etc.) preferred by the first set of terminal devices. For example, the measurement information may comprise at least one of: a reference resource indicator (e.g., a CSI-RS indicator, a CSI resource index, etc.), reference signal received power (RSRP), reference signal received quality (RSRQ), and channel quality information (e.g., CQI, PMI, RI, etc.).

In accordance with some exemplary embodiments, the network node can select, from the first set of terminal devices, a second set of terminal devices to which the multi-user multi-antenna transmission is to be applied, based at least in part on performance gain estimated according to the parameters for multi-user multi-antenna transmission, as shown in block 404.

In accordance with some exemplary embodiments, the parameters for multi-user multi-antenna transmission may comprise multi-user based precoding matrices (e.g., the precoding matrix as shown in formula (4), or any other suitable precoding matrices calculated according to specific MU beamforming schemes). In an exemplary embodiment, the multi-user based precoding matrices and channel matrices of the second set of terminal devices may have a correlation satisfying a certain criterion (e.g., having a relation as described in connection with formulas (2)-(4) or according to other possible construction rules).

In accordance with some exemplary embodiments, the multi-user based precoding matrices may be at least partly different from single-user based precoding matrices indicated by the measurement information. For example, the difference between the multi-user based precoding matrices and the single-user based precoding matrices may reflect a difference between the global optimum achieved by MU beamforming and the sum of local optimums achieved by SU beamforming.

In accordance with some exemplary embodiments, the performance gain estimated according to the parameters for multi-user multi-antenna transmission may comprise at least one of: power gain, SINR gain, and throughput gain. For example, the performance gain can be estimated according to formula (5) and/or formula (6). It can be appreciated that other possible metrics or measurements also may be considered to estimate the performance gain of the multi-user multi-antenna transmission.

In accordance with some exemplary embodiments, the selection of the second set of terminal devices from the first set of terminal devices may be triggered by a specific event, for example, an event that the communication quality is higher than a predefined threshold, such as an SINR threshold as described in connection with FIG. 3, etc. Optionally, the specific event may be associated with capabilities of the network node, capabilities of the terminal device, the transmission strategy, the requirement of service, and/or the network deployment, etc.

In accordance with some exemplary embodiments, the network node can apply the multi-user multi-antenna transmission to the second set of terminal devices, for example, by performing at least one of phase adjustment and amplitude adjustment of precoders for the second set of terminal devices according to the parameters for multi-user multi-antenna transmission. Optionally, beam separation, signal interference and/or other channel parameters may be considered for the adjustment of phases and/or amplitudes of the precoders, so as to achieve a global optimum of the multi-user multi-antenna transmission.

In accordance with some exemplary embodiments, the multi-user multi-antenna transmission may support at least one of: single-layer transmission per device, and multi-layer transmission per device. For example, the network node can determine whether and how to map DL transmissions to different layers, as required. In accordance with some exemplary embodiments, the second set of terminal devices may be assigned same frequency-time resource by the network node. In this case, the optimized MU MIMO transmission according to some exemplary embodiments can further enhance radio resource utilization.

Figure 5:
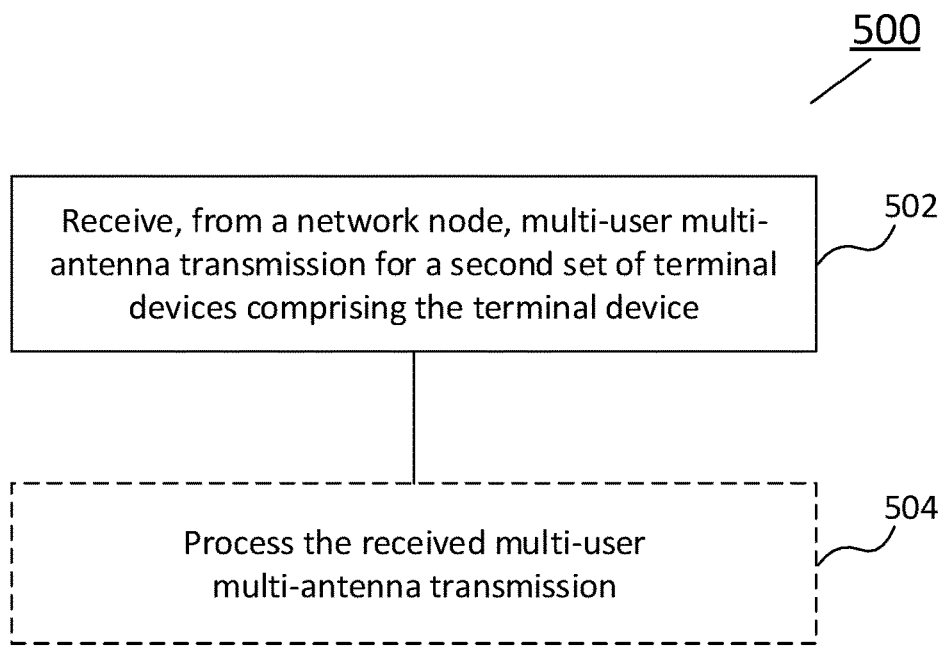
FIG. 5 is a flowchart illustrating another method according to some embodiments of the present disclosure.

FIG. 5 is a flowchart illustrating a method 500 according to some embodiments of the present disclosure. The method 500 illustrated in FIG. 5 may be performed by a terminal device or an apparatus communicatively coupled to the terminal device. In accordance with an exemplary embodiment, the terminal device such as a UE may be configured to communicate with a network node such as a gNB and support multiple antenna technology.

According to the exemplary method 500 illustrated in FIG. 5, the terminal device can receive, from a network node, multi-user multi-antenna transmission for a second set of terminal devices comprising the terminal device, as shown in block 502. It can be appreciated that the network node mentioned here can be configured to perform the exemplary method 400 as illustrated in FIG. 4, and the terminal device described with respect to FIG. 5 may correspond to the terminal device described in connection with FIG. 4. In some exemplary embodiments, parameters for the multi-user multi-antenna transmission can be calculated according to measurement information reported to the network node by a first set of terminal devices. The second set of terminal devices may be selected from the first set of terminal devices, based at least in part on performance gain estimated according to the parameters for multi-user multi-antenna transmission.

In accordance with some exemplary embodiments, the parameters for multi-user multi-antenna transmission may comprise multi-user based transmission parameters such as precoding matrices. The measurement information reported by the first set of terminal devices may comprise single-user based transmission parameters (e.g., single-user based precoding matrices) preferred by the first set of terminal devices, and/or other channel parameters measured by the first set of terminal devices. According to an exemplary embodiment, at least part of the multi-user based precoding matrices may be different from the single-user based precoding matrices. Optionally, the multi-user based precoding matrices may be correlated with channel matrices of the second set of terminal devices according to a certain criterion, so as to achieve the expected performance gain (e.g., the maximum power gain, SINR gain, and/or cell through gain, etc.).

In accordance with some exemplary embodiments, as a member of the second set of terminal devices to which the multi-user multi-antenna transmission is applied, the terminal device may be assigned same frequency-time resource with other terminal devices in the second set of terminal devices. Optionally, the terminal device may process the received multi-user multi-antenna transmission (e.g., to get information for the terminal device), as shown in block 504. In an exemplary embodiment, single-layer transmission per device may be supported in the multi-user multi-antenna transmission. According to another exemplary embodiment, the multi-user multi-antenna transmission may support multi-layer transmission per device.

The proposed solution according to some exemplary embodiments can enable a gNB to determine whether and how to implement MU MIMO transmission to achieve the global optimum performance, for example, according to SU-based measurement reports. On the other hand, various factors such as beam separation, channel parameters, communication quality, etc. may be taken account for evaluating the chances of MU grouping. In an exemplary embodiment, the gNB can determine optimal precoding matrices for MU MIMO transmission, according to SU-based PMIs reported by UEs. Some exemplary embodiments of the present disclosure may support adjustment of phases and/or amplitudes of precoders, so as to increase the MU grouping possibility and enhance tolerance of codebook-based MU MIMO communication.

The various blocks shown in FIGS. 4-5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
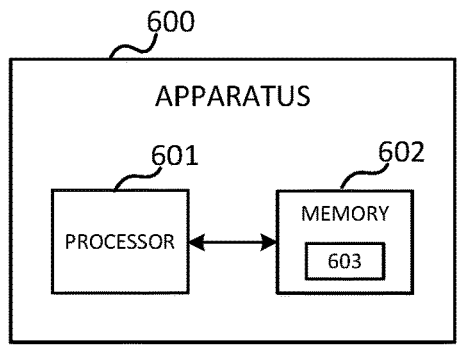
FIG. 6 is a block diagram illustrating an apparatus according to some embodiments of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a network node as described with respect to FIG. 4, or a terminal device as described with respect to FIG. 5. In such case, the apparatus 600 may be implemented as a network node as described with respect to FIG. 4, or a terminal device as described with respect to FIG. 5.

In some implementations, the one or more memories 602 and the computer program codes 603 may be configured to, with the one or more processors 601, cause the apparatus 600 at least to perform any operation of the method as described in connection with FIG. 4. In other implementations, the one or more memories 602 and the computer program codes 603 may be configured to, with the one or more processors 601, cause the apparatus 600 at least to perform any operation of the method as described in connection with FIG. 5. Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7:
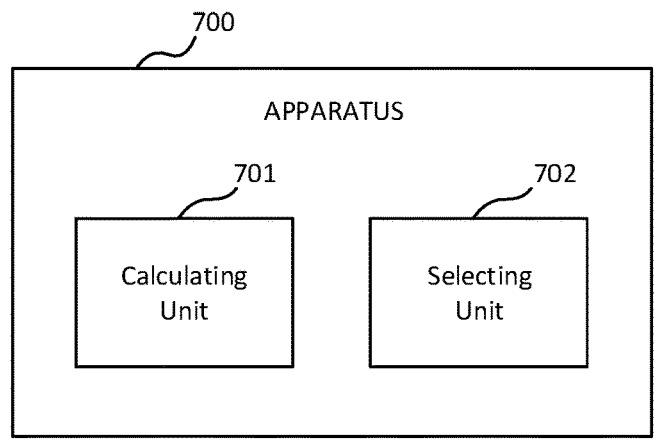
FIG. 7 is a block diagram illustrating another apparatus according to some embodiments of the present disclosure.

FIG. 7 is a block diagram illustrating an apparatus 700 according to some embodiments of the present disclosure. As shown in FIG. 7, the apparatus 700 may comprise a calculating unit 701 and a selecting unit 702. In an exemplary embodiment, the apparatus 700 may be implemented in a network node such as a gNB. The calculating unit 701 may be operable to carry out the operation in block 402, and the selecting unit 702 may be operable to carry out the operation in block 404. Optionally, the calculating unit 701 and/or the selecting unit 702 may be operable to carry out more or less operations to implement the proposed methods according to the exemplary embodiments of the present disclosure.

Figure 8:
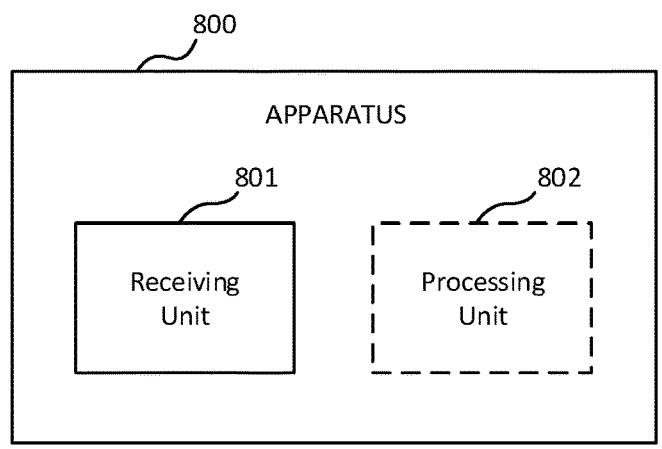
FIG. 8 is a block diagram illustrating yet another apparatus according to some embodiments of the present disclosure.

FIG. 8 is a block diagram illustrating an apparatus 800 according to some embodiments of the present disclosure. As shown in FIG. 8, the apparatus 800 may comprise a receiving unit 801, and optionally a processing unit 802. In an exemplary embodiment, the apparatus 800 may be implemented in a terminal device such as a UE. The receiving unit 801 may be operable to carry out the operation in block 502, and the processing unit 802 may be operable to carry out the operation in block 504. Optionally, the receiving unit 801 and/or the processing unit 802 may be operable to carry out more or less operations to implement the proposed methods according to the exemplary embodiments of the present disclosure.

Figure 9:
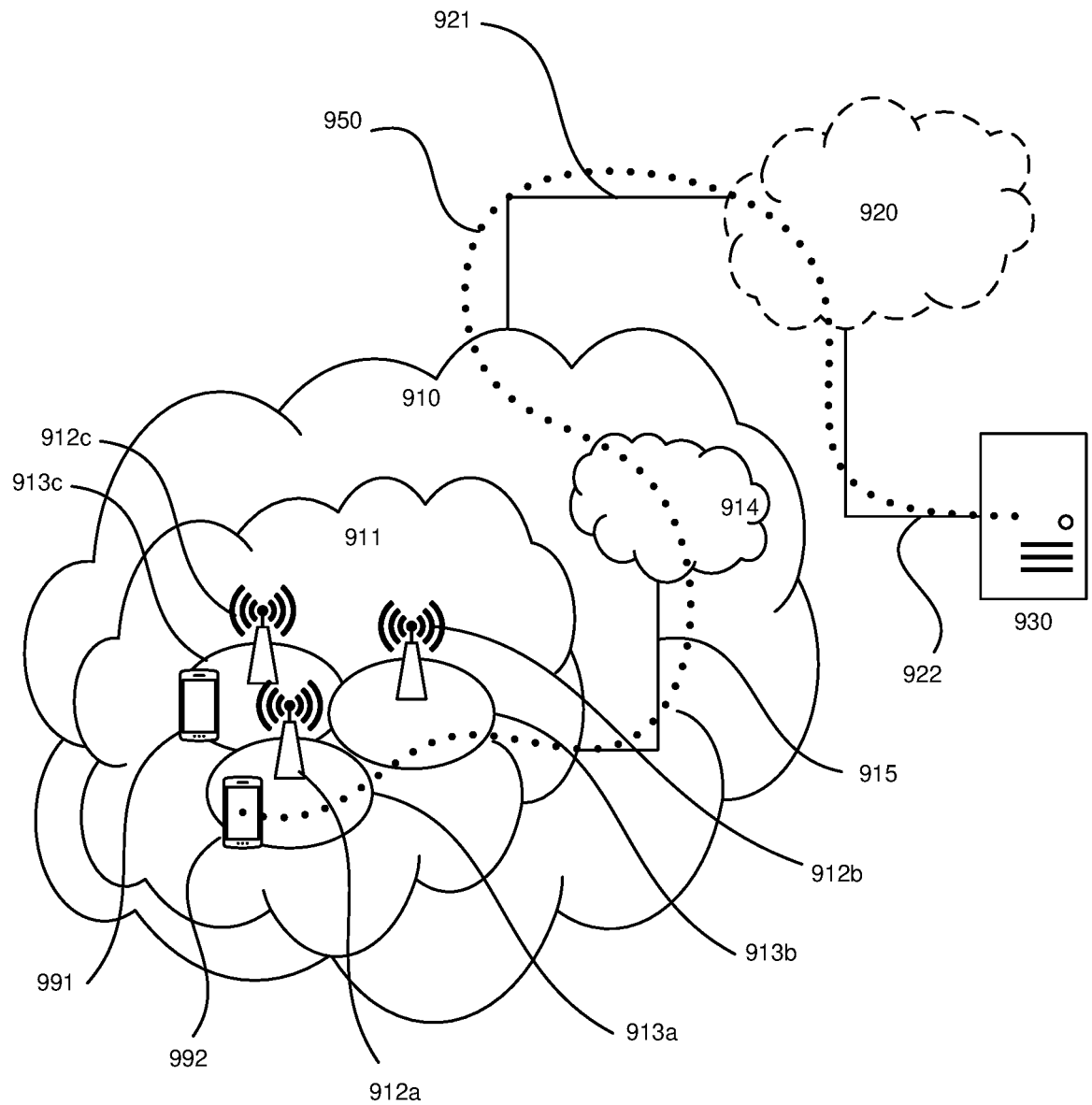
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
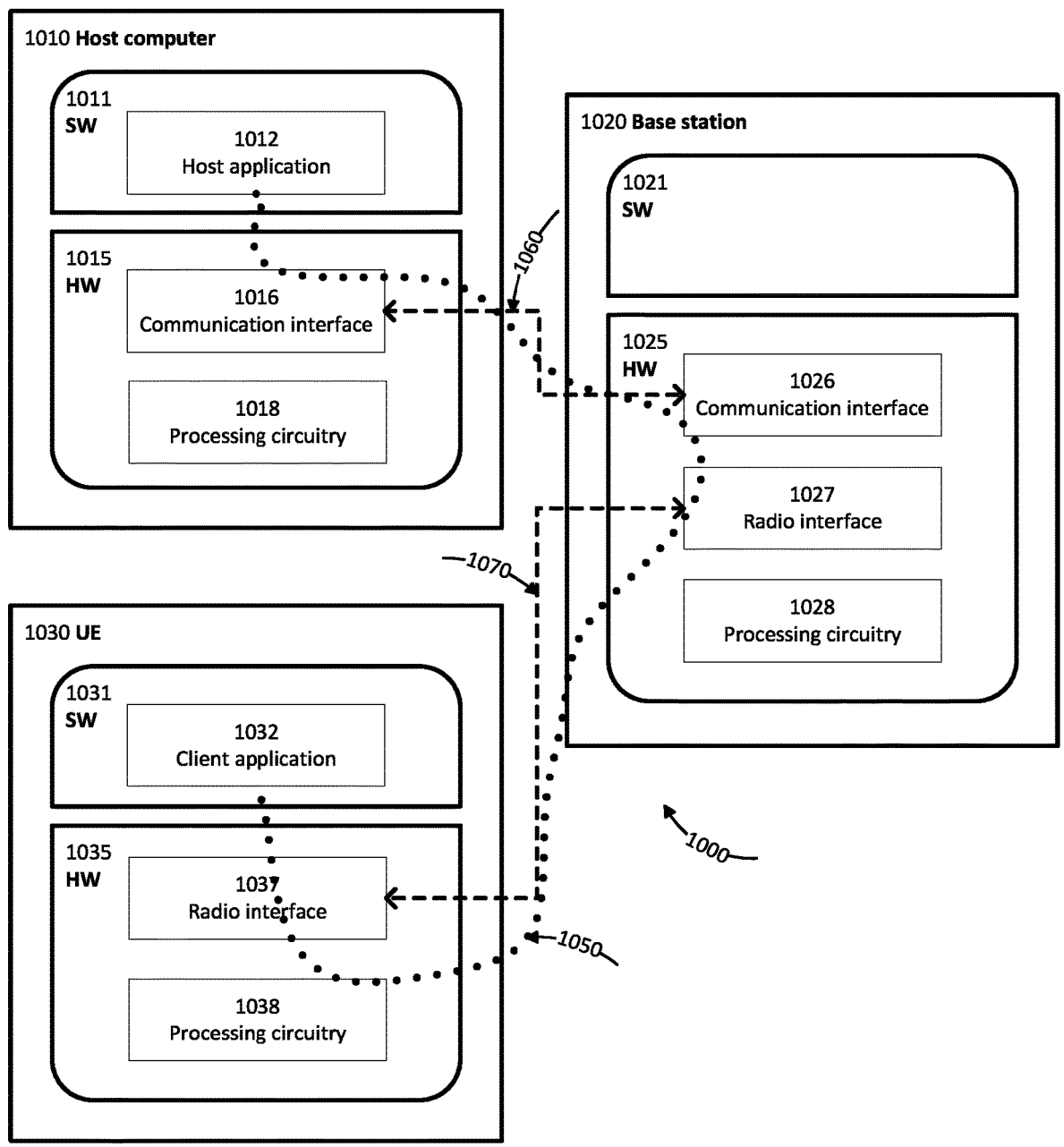
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
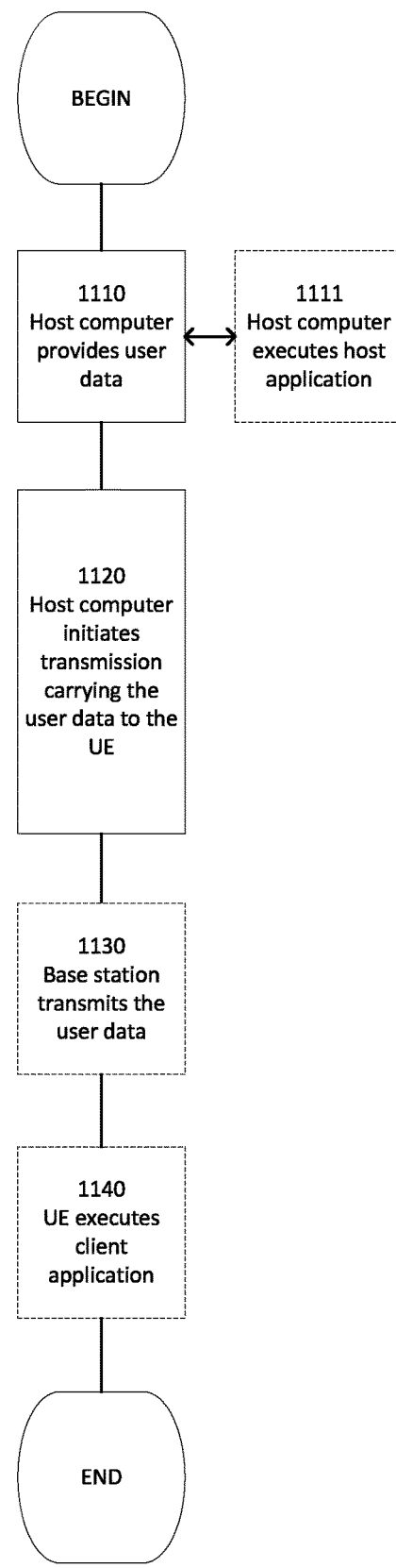
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
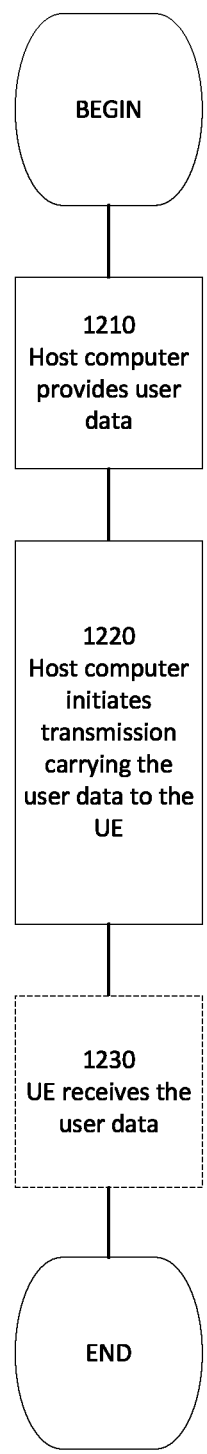
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
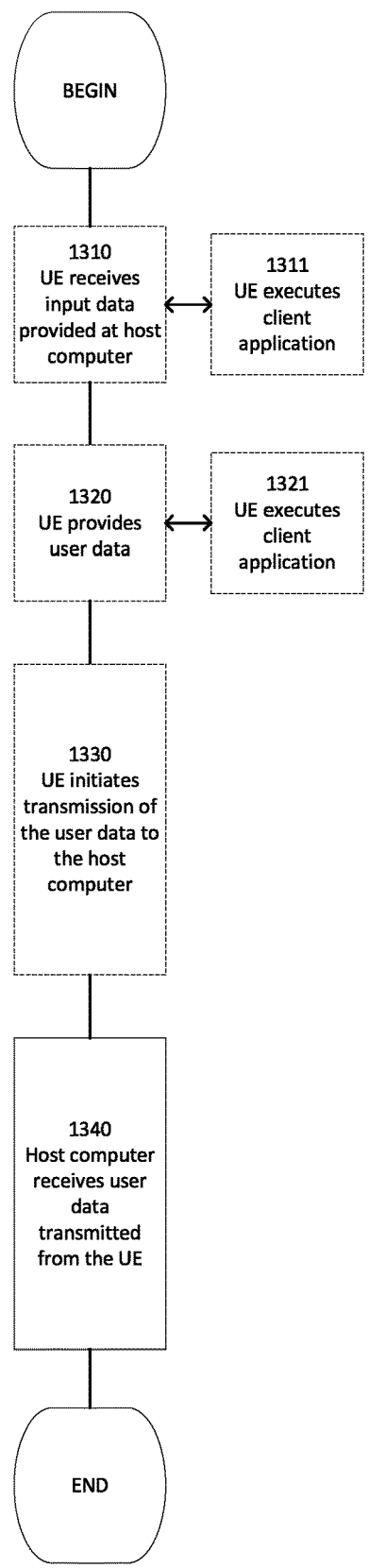
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
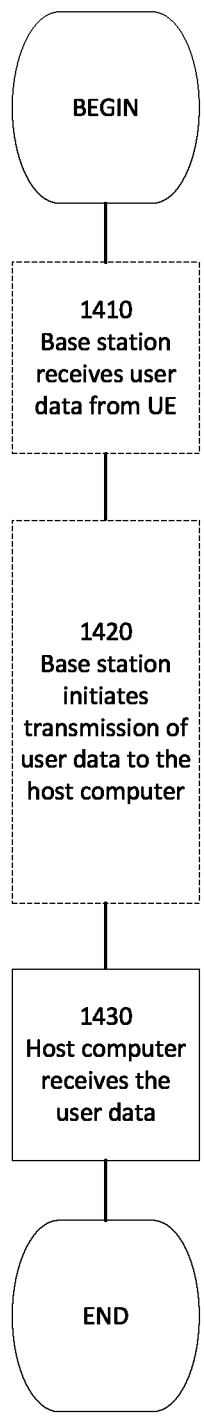
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 400 as describe with respect to FIG. 4.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 400 as describe with respect to FIG. 4.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 500 as describe with respect to FIG. 5.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 500 as describe with respect to FIG. 5.

According to some exemplary embodiments, there is provided a method implemented in a communication system which may include a host computer, a base station and a UE. The method may comprise, at the host computer, receiving user data transmitted to the base station from the UE which may perform any step of the exemplary method 500 as describe with respect to FIG. 5.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 500 as describe with respect to FIG. 5.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 400 as describe with respect to FIG. 4.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 400 as describe with respect to FIG. 4.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a network node, comprising:
calculating parameters for multi-user multi-antenna transmission, according to measurement information reported by a first set of terminal devices; and
selecting, from the first set of terminal devices, a second set of terminal devices to which the multi-user multi-antenna transmission is to be applied, based at least in part on performance gain estimated according to the parameters for multi-user multi-antenna transmission.

2. The method according to claim 1, wherein the measurement information reported by the first set of terminal devices comprises single-user based transmission parameters preferred by the first set of terminal devices.

3. The method according to claim 1, wherein the parameters for multi-user multi-antenna transmission comprise multi-user based precoding matrices.

4. The method according to claim 3, wherein the multi-user based precoding matrices are at least partly different from single-user based precoding matrices indicated by the measurement information.

5. The method according to claim 3, wherein the multi-user based precoding matrices and channel matrices of the second set of terminal devices have a correlation satisfying a certain criterion.

6. The method according to claim 1, wherein the performance gain estimated according to the parameters for multi-user multi-antenna transmission comprises at least one of:
power gain;
signal to interference plus noise ratio gain; and
throughput gain.

7. The method according to claim 1, wherein the selection of the second set of terminal devices from the first set of terminal devices is triggered by a specific event.

8. The method according to claim 1, further comprising:
applying the multi-user multi-antenna transmission to the second set of terminal devices, by performing at least one of phase adjustment and amplitude adjustment of precoders for the second set of terminal devices according to the parameters for multi-user multi-antenna transmission.

9. The method according to claim 1, wherein the multi-user multi-antenna transmission supports at least one of: single-layer transmission per device, and multi-layer transmission per device.

10. The method according to claim 1, wherein the second set of terminal devices are assigned same frequency-time resource by the network node.

11. A method performed by a terminal device, comprising:
receiving, from a network node, multi-user multi-antenna transmission for a second set of terminal devices comprising the terminal device, wherein parameters for the multi-user multi-antenna transmission are calculated according to measurement information reported to the network node by a first set of terminal devices, and wherein the second set of terminal devices are selected from the first set of terminal devices based at least in part on performance gain estimated according to the parameters for multi-user multi-antenna transmission.

12. The method according to claim 11, wherein the measurement information reported by the first set of terminal devices comprises single-user based transmission parameters preferred by the first set of terminal devices.

13. The method according to claim 11, wherein the parameters for multi-user multi-antenna transmission comprise multi-user based precoding matrices.

14. The method according to claim 13, wherein the multi-user based precoding matrices are at least partly different from single-user based precoding matrices indicated by the measurement information.

15. The method according to claim 13, wherein the multi-user based precoding matrices and channel matrices of the second set of terminal devices have a correlation satisfying a certain criterion.

16. The method according to claim 11, wherein the performance gain estimated according to the parameters for multi-user multi-antenna transmission comprises at least one of:
power gain;
signal to interference plus noise ratio gain; and
throughput gain.

17. The method according to claim 11, wherein the multi-user multi-antenna transmission supports at least one of: single-layer transmission per device, and multi-layer transmission per device.

18. The method according to claim 11, wherein the terminal device is assigned same frequency-time resource with other terminal devices in the second set of terminal devices.

19. A network node, comprising:
one or more processors; and
one or more memories comprising computer program codes,
the one or more memories and the computer program codes configured to, with the one or more processors, cause the network node at least to:
calculate parameters for multi-user multi-antenna transmission, according to measurement information reported by a first set of terminal devices; and
select, from the first set of terminal devices, a second set of terminal devices to which the multi-user multi-antenna transmission is to be applied, based at least in part on performance gain estimated according to the parameters for multi-user multi-antenna transmission.

20. A terminal device, comprising:
one or more processors; and
one or more memories comprising computer program codes,
the one or more memories and the computer program codes configured to, with the one or more processors, cause the terminal device at least to:
receive, from a network node, multi-user multi-antenna transmission for a second set of terminal devices comprising the terminal device, wherein parameters for the multi-user multi-antenna transmission are calculated according to measurement information reported to the network node by a first set of terminal devices, and wherein the second set of terminal devices are selected from the first set of terminal devices based at least in part on performance gain estimated according to the parameters for multi-user multi-antenna transmission.

* * * * *